US012424111B2

(12) United States Patent
Modalavalasa et al.

(10) Patent No.: US 12,424,111 B2
(45) Date of Patent: Sep. 23, 2025

(54) SYSTEM AND METHOD FOR PERFORMING RE-ROUTING IN REAL TIME

(71) Applicant: Rockwell Collins, Inc., Cedar Rapids, IA (US)

(72) Inventors: Hari Krishna Modalavalasa, Hyderabad (IN); Nitesh Teja Mudapaka, Telangana (IN); Jason A. Myren, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 113 days.

(21) Appl. No.: 18/226,101

(22) Filed: Jul. 25, 2023

(65) Prior Publication Data

US 2024/0321117 A1 Sep. 26, 2024

(30) Foreign Application Priority Data

Mar. 24, 2023 (IN) ............................ 202311021058

(51) Int. Cl.

*G08G 5/00* (2025.01)
*G08G 5/34* (2025.01)
*G08G 5/55* (2025.01)
*G08G 5/59* (2025.01)

(Continued)

(52) U.S. Cl.

CPC ................ *G08G 5/34* (2025.01); *G08G 5/55* (2025.01); *G08G 5/59* (2025.01); *G08G 5/723* (2025.01); *G08G 5/76* (2025.01)

(58) Field of Classification Search

CPC .. G08G 5/34; G08G 5/55; G08G 5/59; G08G 5/723; G08G 5/76; A61K 40/4262; H10D 30/6723; H10D 30/797; H10D 84/972; H10D 84/0126; H10D 84/977;

(Continued)

(56) References Cited

U.S. PATENT DOCUMENTS

| | | | | |
|---|---|---|---|---|
| 9,171,473 | B1 * | 10/2015 | McNally | G08G 5/00 |
| 9,513,125 | B2 | 12/2016 | Ravenscroft | |
| 9,558,670 | B1 * | 1/2017 | Sheth | G08G 5/55 |

(Continued)

OTHER PUBLICATIONS

Mosarc Avoidance Re-Router Software Application, Open Systems Architecture, Future-Ready Avionics, Hazard avoidance and route optimization; collinsaerospace.com/Mosarc (2022).

(Continued)

*Primary Examiner* — Peter D Nolan
*Assistant Examiner* — Peter Y Ning
(74) *Attorney, Agent, or Firm* — Suiter Swantz IP

(57) ABSTRACT

A system may include a processor configured to: (a) obtain parameters; (b) based on the parameters, update flight-state data associated with an aircraft; (c) obtain a trained machine learning (ML) model; (d) based at least on the updated flight-state data and the trained ML model, infer a direction from a current cell for a reroute; (e) based on the inferred direction and the updated flight-state data, set the current cell and identify neighboring cells; (f) calculate an optimal next cell by using a shortest path finding (SPF) algorithm to select the optimal next cell from the neighboring cells; (g) iteratively repeat steps (d) through (f) such that the current cell is set as the optimal next cell until a goal state is reached; (h) construct a re-route using optimal cells iteratively calculated in step (f); and (i) output the re-route.

18 Claims, 7 Drawing Sheets

(51) Int. Cl.
*G08G 5/72* (2025.01)
*G08G 5/76* (2025.01)

(58) Field of Classification Search
CPC . H10F 39/1847; H10F 77/1692; A23B 40/60; H10H 29/39
See application file for complete search history.

(56) References Cited

U.S. PATENT DOCUMENTS

| | | | |
|---|---|---|---|
| 9,595,199 | B2 | 3/2017 | Hedrick et al. |
| 9,847,031 | B2 | 12/2017 | Agarwal et al. |
| 9,965,961 | B2 | 5/2018 | Agrawal |
| 10,297,160 | B1 | 5/2019 | O'Leary |
| 10,607,499 | B2 | 3/2020 | Chen et al. |
| 10,983,533 | B2 | 4/2021 | Costas |
| 11,353,888 | B2 | 6/2022 | Iyer |
| 2010/0094485 | A1 | 4/2010 | Verlut et al. |
| 2020/0290740 | A1* | 9/2020 | Rangan .................. G06V 40/18 |
| 2021/0312819 | A1 | 10/2021 | Ayhan et al. |
| 2021/0383706 | A1* | 12/2021 | Gibbons, II ............. G08G 5/26 |
| 2022/0028287 | A1* | 1/2022 | Durant ................. G06Q 10/047 |
| 2022/0068147 | A1 | 3/2022 | Girard et al. |
| 2022/0246046 | A1* | 8/2022 | Ali ........................... G08G 5/55 |
| 2022/0252401 | A1* | 8/2022 | Lupu ...................... G01C 21/20 |
| 2022/0335837 | A1* | 10/2022 | Agyekum ................ G08G 5/30 |
| 2023/0386346 | A1* | 11/2023 | Schwartz ................. G08G 5/76 |

OTHER PUBLICATIONS

European Patent Office, Extended European Search Report received in EP Application No. 24165654.5, Aug. 20, 2024, 10 pages.

* cited by examiner $$f(n) = \begin{cases} g(n) + h(n) & \textit{cell - n is in ML suggested direction else where} \\ \infty & \end{cases} \quad (1)$$

$$f(n) = \sum_{i=1}^{N} (w_i * x_i) \quad (2)$$

*Where,*

$f(x)$ is the total path cost g(n) is the path cost from the start cell to current cell '*n*' h(n) is the heuristic cost function to destination cell $w_i$ is the weight of parameter *i*

$X_i$ is the value of parameter *i*

N is the number of parameters considered in cost calculation

FIG. 6

SYSTEM AND METHOD FOR PERFORMING RE-ROUTING IN REAL TIME

CROSS-REFERENCE TO RELATED APPLICATIONS

The present application is related to and claims priority from: Indian application Ser. No. 20/231,1021058, titled SYSTEM AND METHOD FOR PERFORMING RE-ROUTING IN REAL TIME, filed Mar. 24, 2023. Indian application Ser. No. 20/231,1021058 is herein incorporated by reference in its entirety.

BACKGROUND

Currently, some aircraft are equipped with path re-routers (e.g., avoidance re-routers). An avoidance re-router (ARR) is an advanced cognitive decision aiding application for pilots to quickly react to stationary or moving threats encountered along a flight path. The ARR may consider such parameters as fuel, time, safety, etc. The ARR may increase safety and reduce pilot load. Currently, ARRs are based on rule-based path planning, such as shortest path finding (SPF) algorithms, which helps to find a flight path in the presence of hazards on the flight path. SPF algorithms are well-known in the art. Currently, the performance of an ARR may be limited when the number of parameters considered is increased. Currently, the ARR may consider forty or more parameters, which when all are considered may increase latency in rerouting. Additionally, SPF algorithms may have difficulty in handling accelerating weather while calculating rerouting. For example, SPF algorithms may have difficulty in incorporating pilot best practices and/or pilot intuition, such as a pilot viewing weather forecasts or predictions as risky and adjusting paths away from the weather occurrences.

SUMMARY

In one aspect, embodiments of the inventive concepts disclosed herein are directed to a system. The system may include at least one processor configured to perform re-routing of an aircraft in real time. The at least one processor further configured to: (a) obtain parameters including at least one of flight parameters associated with the aircraft, weather parameters, special use airspace parameters, or air traffic parameters; (b) based at least on the parameters, update flight-state data associated with the aircraft; (c) obtain a trained machine learning (ML) model; (d) based at least on the updated flight-state data and the trained ML model, infer a direction from a current cell for a reroute; (e) based at least on the inferred direction and the updated flight-state data, set the current cell and identify neighboring cells neighboring both (1) the current cell and (2) the inferred direction; (f) calculate an optimal next cell by using a shortest path finding (SPF) algorithm to select the optimal next cell from the neighboring cells; (g) iteratively repeat at least steps (d) through (f) such that the current cell is set as the optimal next cell until a goal state is reached; (h) construct a re-route using optimal cells iteratively calculated in step (f); and (i) output the re-route.

In a further aspect, embodiments of the inventive concepts disclosed herein are directed to a method. The method may include: (a) obtaining, by at least one processor, parameters including at least one of flight parameters associated with an aircraft, weather parameters, special use airspace parameters, or air traffic parameters; (b) based at least on the parameters, updating, by the at least one processor, flight-state data associated with the aircraft; (c) obtaining, by the at least one processor, a trained machine learning (ML) model; (d) based at least on the updated flight-state data and the trained ML model, inferring, by the at least one processor, a direction from a current cell; (e) based at least on the inferred direction and the updated flight-state data, setting, by the at least one processor, the current cell and identifying, by the at least one processor, neighboring cells neighboring both (1) the current cell and (2) the inferred direction; (f) calculating, by the at least one processor, an optimal next cell by using a shortest path finding (SPF) algorithm to select the optimal next cell from the neighboring cells; (g) iteratively repeating, by the at least one processor, at least steps (d) through (f) such that the current cell is set as the optimal next cell until a goal state is reached; (h) constructing, by the at least one processor, a re-route using optimal cells iteratively calculated in step (f); and (i) outputting, by the at least one processor, the re-route, wherein the at least one processor is configured to perform re-routing of the aircraft in real time.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 6 show equations, which may be used in an exemplary embodiment, according to the inventive concepts disclosed herein.

DETAILED DESCRIPTION

Figure 1:
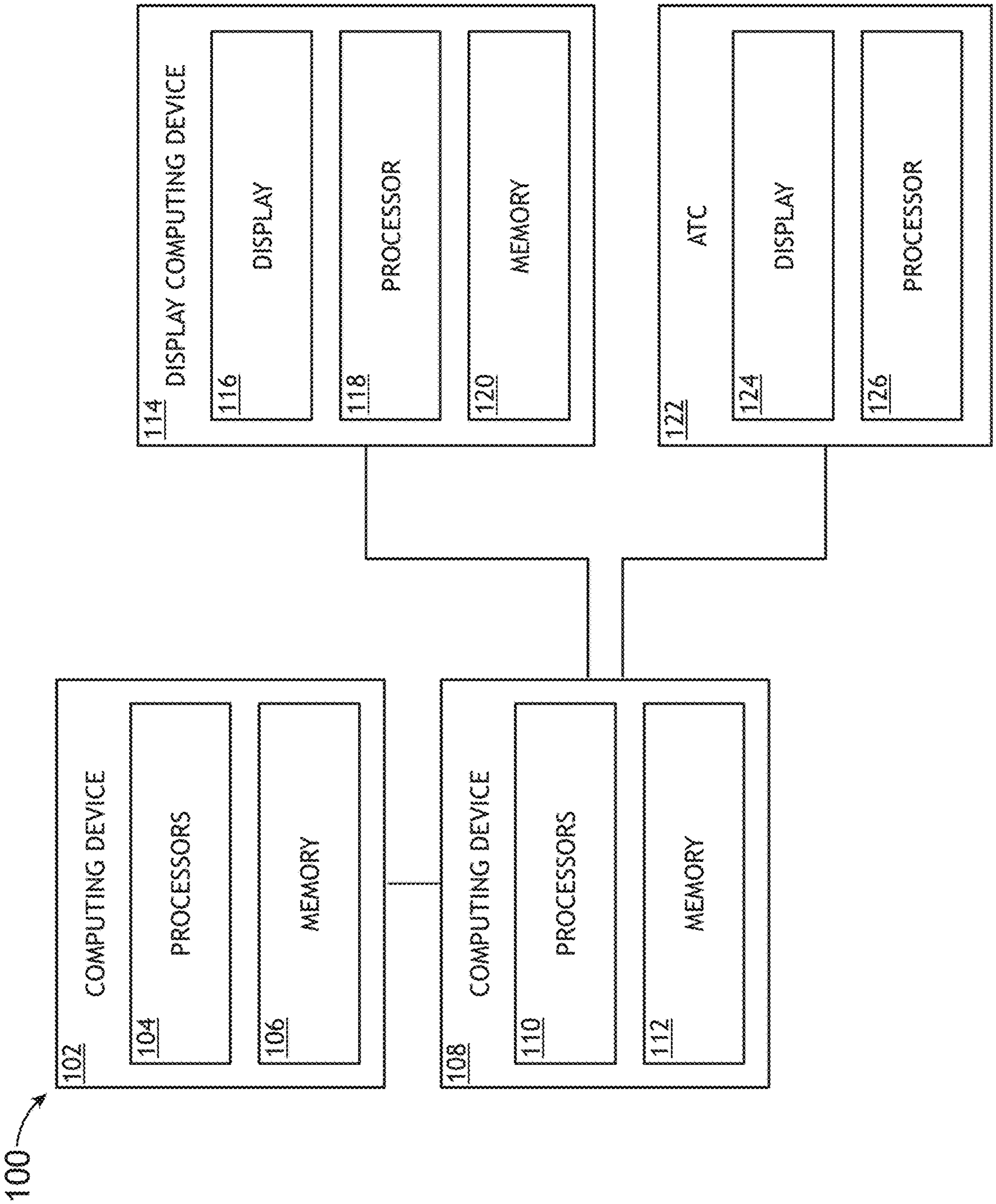
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, “or” refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the “a” or “an” are employed to describe elements and components of embodiments of the instant inventive concepts. This is done merely for convenience and to give a general sense of the inventive concepts, and “a” and “an” are intended to include one or at least one and the singular also includes the plural unless it is obvious that it is meant otherwise.

Finally, as used herein any reference to “one embodiment,” or “some embodiments” means that a particular element, feature, structure, or characteristic described in connection with the embodiment is included in at least one embodiment of the inventive concepts disclosed herein. The appearances of the phrase “in some embodiments” in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to perform re-routing of an aircraft in real time. Some embodiments may integrate machine learning (ML) and/or artificial intelligence (AI) with SPF algorithms to determine a re-route path (e.g., an optimal re-route path) in the presence of hazards to a planned flight path.

Figure 3:
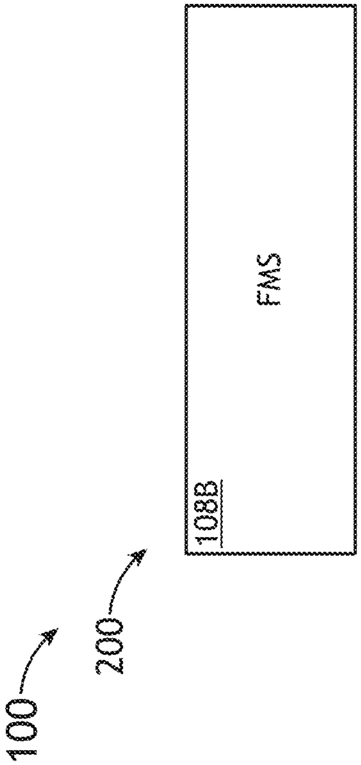
FIG. 3 is a view of an exemplary embodiment of a computing device of the system of FIG. 1 according to the inventive concepts disclosed herein.
Figure 2:
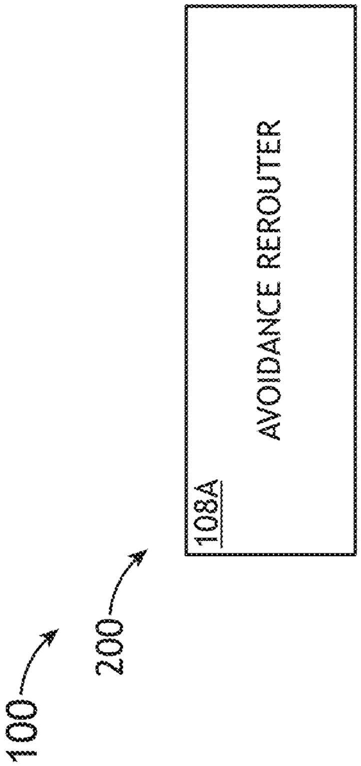
FIG. 2 is a view of an exemplary embodiment of a computing device of the system of FIG. 1 according to the inventive concepts disclosed herein.

Referring now to FIGS. 1-3, an exemplary embodiment of a system 100 according to the inventive concepts disclosed herein is depicted. In some embodiments, the system 100 may include an aircraft 200 (e.g., a piloted, remote piloted, and/or uncrewed aerial vehicle (UAV)), such as shown in FIGS. 2-3. The system 100 may include at least one computing device 102, at least one computing device 108, at least one display computing device 114, at least one ground computing device (e.g., at least one air traffic control 122) configured to provide a service offered to generate flight plans for evaluation by aircraft, and/or the aircraft 200, some or all of which may be communicatively coupled at any given time.

In some embodiments, any or all of the computing device 102, the computing device 108, and/or the display computing device 114 may be installed onboard the aircraft 200. In other embodiments, some or all of the computing device 102, the computing device 108, and/or the display computing device 114 may be installed off-board of the aircraft, such as in the air-traffic control 122. In other embodiments, some or all of the computing device 102, the computing device 108, and/or the display computing device 114 may be redundantly installed onboard and off-board of the aircraft.

The at least one computing device 102 may be implemented as any suitable computing device, such as a personal computer and/or servers. The at least one computing device 102 may include any or all of the elements, as shown in FIG. 1. For example, the computing device 102 may include at least one processor 104, at least one memory 106, and/or at least one storage, some or all of which may be communicatively coupled at any given time. For example, the at least one processor 104 may include at least one central processing unit (CPU), at least one graphics processing unit (GPU), at least one field-programmable gate array (FPGA), at least one application specific integrated circuit (ASIC), at least one digital signal processor, at least one deep learning processor unit (DPU), at least one virtual machine (VM) running on at least one processor, and/or the like configured to perform (e.g., collectively perform) any of the operations disclosed throughout. For example, the at least one processor 104 may include a CPU and a GPU configured to perform (e.g., collectively perform) any of the operations disclosed throughout. The processor 104 may be configured to run various software applications or computer code stored (e.g., maintained) in a non-transitory computer-readable medium (e.g., memory 106 and/or storage) and configured to execute various instructions or operations. For example, the processor 104 of the computing device 102 may be configured to: obtain relevant historical data of filed flight paths, air traffic, and actual flight paths taken by pilots; and/or train a ML model to identify an optimal direction from a given cell at a point along a re-route. In some embodiments, the trained ML model is trained based at least on real-world samples of filed paths as compared to actual paths taken by sampled aircraft.

The at least one computing device 108 may be implemented as any suitable computing device, such as path re-router (e.g., an ARR 108A, as shown in FIG. 2) and/or a flight management system (as shown in FIG. 3). The at least one computing device 108 may include any or all of the elements, as shown in FIG. 1. For example, the computing device 108 may include at least one processor 110, at least one memory 112, and/or at least one storage, some or all of which may be communicatively coupled at any given time. For example, the at least one processor 110 may include at least one central processing unit (CPU), at least one graphics processing unit (GPU), at least one field-programmable gate array (FPGA), at least one application specific integrated circuit (ASIC), at least one digital signal processor, at least one deep learning processor unit (DPU), at least one virtual machine (VM) running on at least one processor, and/or the like configured to perform (e.g., collectively perform) any of the operations disclosed throughout. For example, the at least one processor 110 may include a CPU and a GPU configured to perform (e.g., collectively perform) any of the operations disclosed throughout. The processor 110 may be configured to run various software applications or computer code stored (e.g., maintained) in a non-transitory computer-readable medium (e.g., memory 112 and/or storage) and configured to execute various instructions or operations. For example, the processor 110 of the aircraft computing device 108 may be configured to: perform re-routing of an aircraft in real time. In some embodiments, the processor 110 of the aircraft computing device 108 may be further configured to: (a) obtain parameters including at least one of flight parameters associated with the aircraft, weather parameters, special use airspace parameters, or air traffic parameters; (b) based at least on the parameters, update flight-state data associated with the aircraft; (c) obtain a trained machine learning (ML) model, such as from the computing device 102; (d) based at least on the updated flight-state data and the trained ML model, infer a direction from a current cell; (e) based at least on the inferred direction and the updated flight-state data, set the current cell and identify neighboring cells neighboring both (1) the current cell and (2) the inferred direction; (f) calculate an optimal next cell by using a shortest path finding (SPF) algorithm to select the optimal next cell from the neighboring cells; (g) iteratively repeat at least steps (d) through (f) such that the current cell is set as the optimal next cell until a goal state is reached; (h) construct a re-route using optimal cells iteratively calculated in step (f); and/or (i) output the re-route (e.g., to a display 116 for presentation to a pilot and/or to air traffic control 122). In some embodiments, the at least one processor 110 is further configured to based at least on the inferred direction and the updated flight-state data, set the current cell, identify the neighboring cells neighboring both (1) the current cell and (2) the inferred direction, and disable non-neighboring cells. In some embodiments, the at least one processor 110 may be further configured to use artificial intelligence (AI) acceleration and/or neural processing to perform at least one of the steps of (a) through (i).

The at least one display computing device 114 may be implemented as any suitable display computing device, such as a head-up display computing device, a head-down display computing device, or a multi-function window (MFW) display computing device. The at least one display computing device 114 may include any or all of the elements, as shown in FIG. 1. For example, the display computing device 114 may include at least one display 116, at least one processor 118, at least one memory 120, and/or at least one storage, some or all of which may be communicatively coupled at any given time. For example, the at least one processor 118 may include at least one central processing unit (CPU), at least one graphics processing unit (GPU), at least one field-programmable gate array (FPGA), at least one application specific integrated circuit (ASIC), at least one digital signal processor, at least one deep learning processor unit (DPU), at least one virtual machine (VM) running on at least one processor, and/or the like configured to perform (e.g., collectively perform) any of the operations disclosed throughout. For example, the at least one processor 118 may include a CPU and a GPU configured to perform (e.g., collectively perform) any of the operations disclosed throughout. The processor 118 may be configured to run various software applications or computer code stored (e.g., maintained) in a non-transitory computer-readable medium (e.g., memory 120 and/or storage) and configured to execute various instructions or operations. For example, the processor 118 of the display computing device 114 may be configured to: receive the re-route, such as from the computing device 108; and/or output graphical data associated with the re-route to the display 116.

The at least one air traffic control 122. The at least one air traffic control 122 may include any or all of the elements, as shown in FIG. 1. For example, the air traffic control 122 may include at least one processor 124, at least one memory 126, and/or at least one storage, some or all of which may be communicatively coupled at any given time. For example, the at least one processor 124 may include at least one central processing unit (CPU), at least one graphics processing unit (GPU), at least one field-programmable gate array (FPGA), at least one application specific integrated circuit (ASIC), at least one digital signal processor, at least one deep learning processor unit (DPU), at least one virtual machine (VM) running on at least one processor, and/or the like configured to perform (e.g., collectively perform) any of the operations disclosed throughout. For example, the at least one processor 124 may include a CPU and a GPU configured to perform (e.g., collectively perform) any of the operations disclosed throughout. The processor 124 may be configured to run various software applications or computer code stored (e.g., maintained) in a non-transitory computer-readable medium (e.g., memory 126 and/or storage) and configured to execute various instructions or operations. For example, the processor 124 of the display computing device 114 may be configured to: receive the re-route, such as from the computing device 108; and/or output graphical data associated with the re-route to the display 116 for presentation to an air traffic controller or remote pilot.

Some embodiments may include integrating an SPF algorithm(s) with an ML based classification algorithm.

For example, some embodiments may include collecting relevant data, such as by (a) identifying and/or collecting relevant flight paths by documenting a reason for deviations a planned flight path, and/or (b) based on a requirement, processing data collected to train the ML model.

For example, some embodiments may include integrating the SPF algorithm(s) with the ML based classification algorithm, such as by (a) reducing a number of directions the SPF algorithm needs to analyze by using ML based classification, (b) training the ML based classification model to identify one optimal direction at each of given cells (e.g., locations or waypoints), wherein the data for training may include parameters, such as weather, fuel, air traffic, special use airspace, and/or etc. For example, the ML model may predict one direction (e.g., an optimal direction) at a given cell (such as shown in FIG. 5) to reduce a load of executing the SPF algorithm to calculate a re-route in real time.

Some embodiments that include integration of an SPF algorithm with ML based classification. Some embodiments may consider forty or more parameters, such as by analyzing and applying dimensionality reduction techniques to identify important parameters. Some embodiments may identify deviations from filed paths and actual paths using visualizations, which may help in finding an optimal reroute. Some embodiments may integrate ML based classification techniques with an SPF algorithm, which may reduce a number of directions for the SPF algorithm to analyze, which in turn may reduce latency and increase efficiency of the re-routing.

Figure 4:
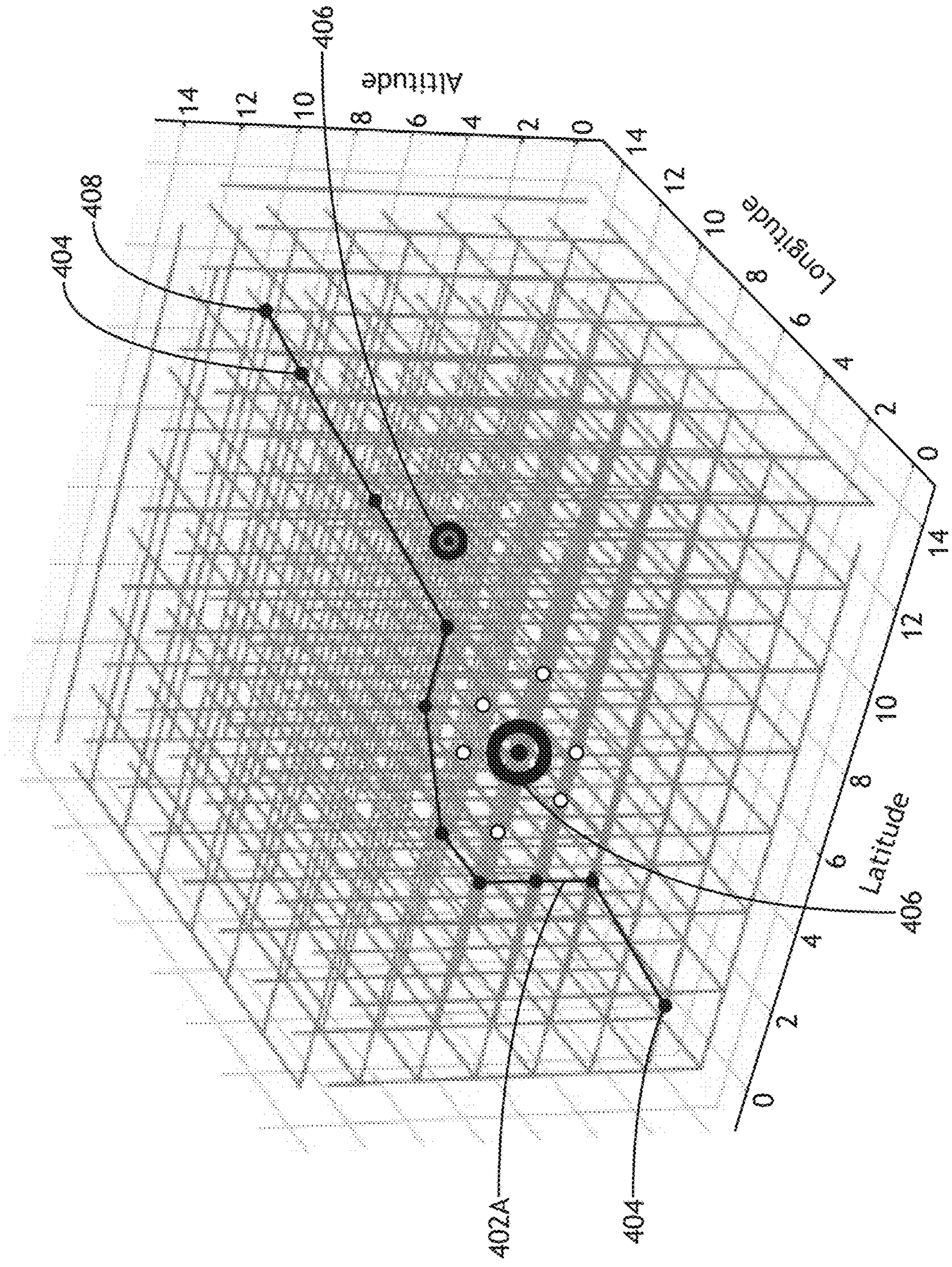
FIG. 4 is a diagram of a currently implemented re-route according to the inventive concepts disclosed herein.
Figure 5:
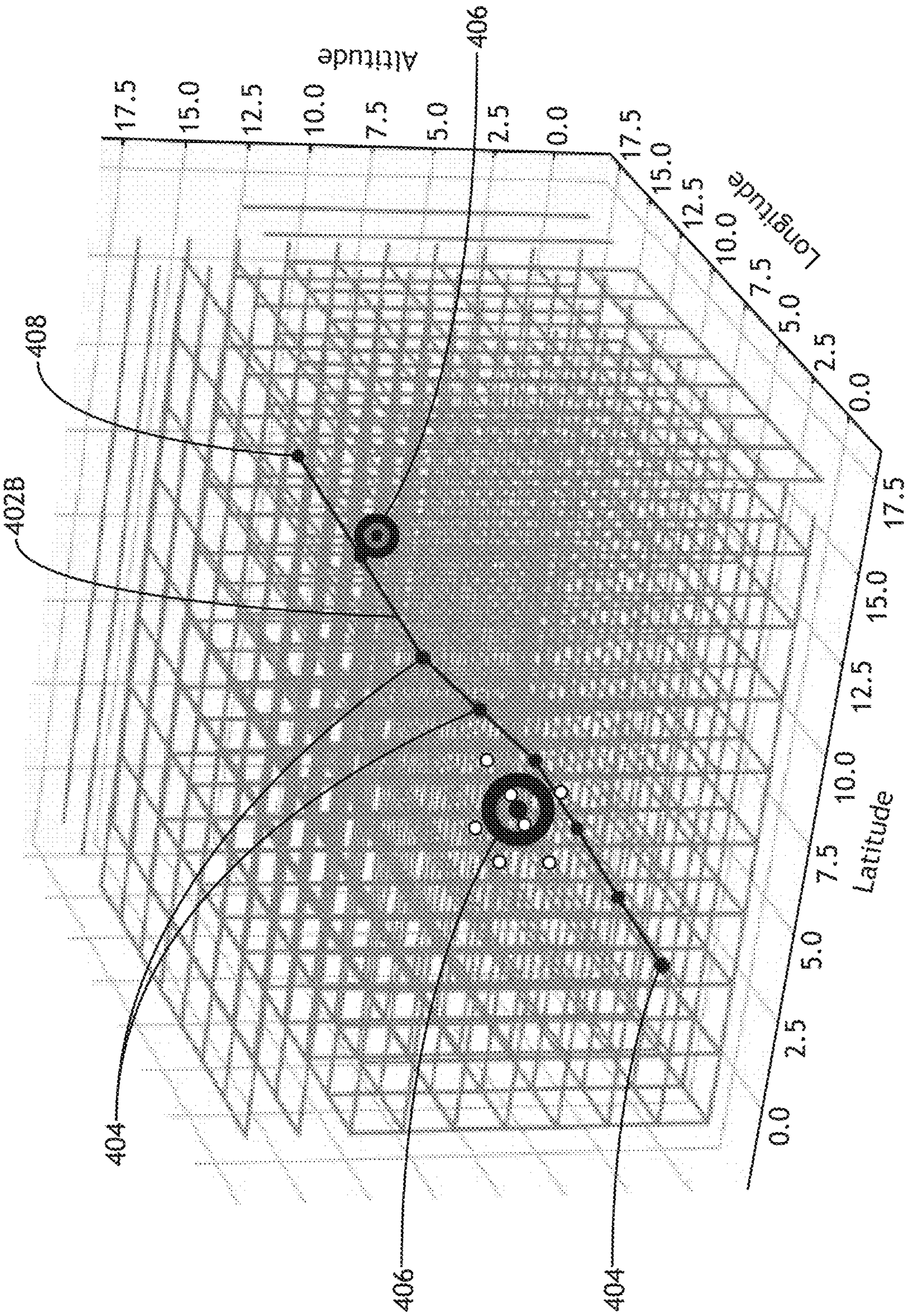
FIG. 5 is a diagram of an exemplary embodiment of a re-route according to the inventive concepts disclosed herein.

Referring generally to FIGS. 4-5, diagrams of a currently implemented re-route 402A and an exemplary embodiment of a re-route 402B according to the inventive concepts disclosed herein are depicted. Each reroute 402A, 402B may include a path connecting cells 404 toward a goal state 408, whereby the path avoids hazards 406.

In some embodiments, each cell 404 may be part of a three-dimensional array of cells 404, each cell 404 representing a location in three-dimensional space. In some embodiments, each cell 404 may represent a waypoint. In some embodiments, a goal state 408 may represents a destination, a location where the re-route rejoins a flight plan, or a particular waypoint.

As shown in FIG. 4, a diagram of a currently implemented re-route 402A is shown as compared to the exemplary embodiment of a re-route 402B of FIG. 5. For example, the exemplary embodiment of a re-route 402B of FIG. 5 may provide an 80% reduction in processing load of running the SPF algorithm by utilizing the integration of ML with the SPF algorithm. For example, a cost (e.g., which in part may be a function of distance) metric may be reduced considerably by utilizing the integration of ML with the SPF algorithm. Additionally, the exemplary embodiment of a re-route 402B of FIG. 5 may be very accurate, such as 90% or more accurate based on test data.

FIG. 6 shows equations, which may be used in an exemplary embodiment.

Referring now to Equation (1) of FIG. 6, Equation (1) describes how the SPF algorithm may consider a predicted direction from the ML interference in real time. (The typical SPF algorithm considers both path cost and heuristic cost to calculate a route; Equation (2) represents the heuristic function.) In some embodiments, based on the calculated f(n), a current cell is set, an ML predicted direction is enabled, and remaining cells may be disabled. This integration method can have custom triggers depending on an application need. For example, weather hazard approach was tested as a trigger; other exemplary triggers may include, but not be limited to, at each way point, for a particular time period, a user trigger, etc.

In some embodiments, using ML integrated with an SPF algorithm may increase efficiency by reducing a processing load of the SPF algorithm, may decrease latency, may allow for ML training on real world pilot behaviors that can be applied to route generation (e.g., which can increase pilot acceptance of such routing), and may allow for ease of adding new parameters.

Figure 7:
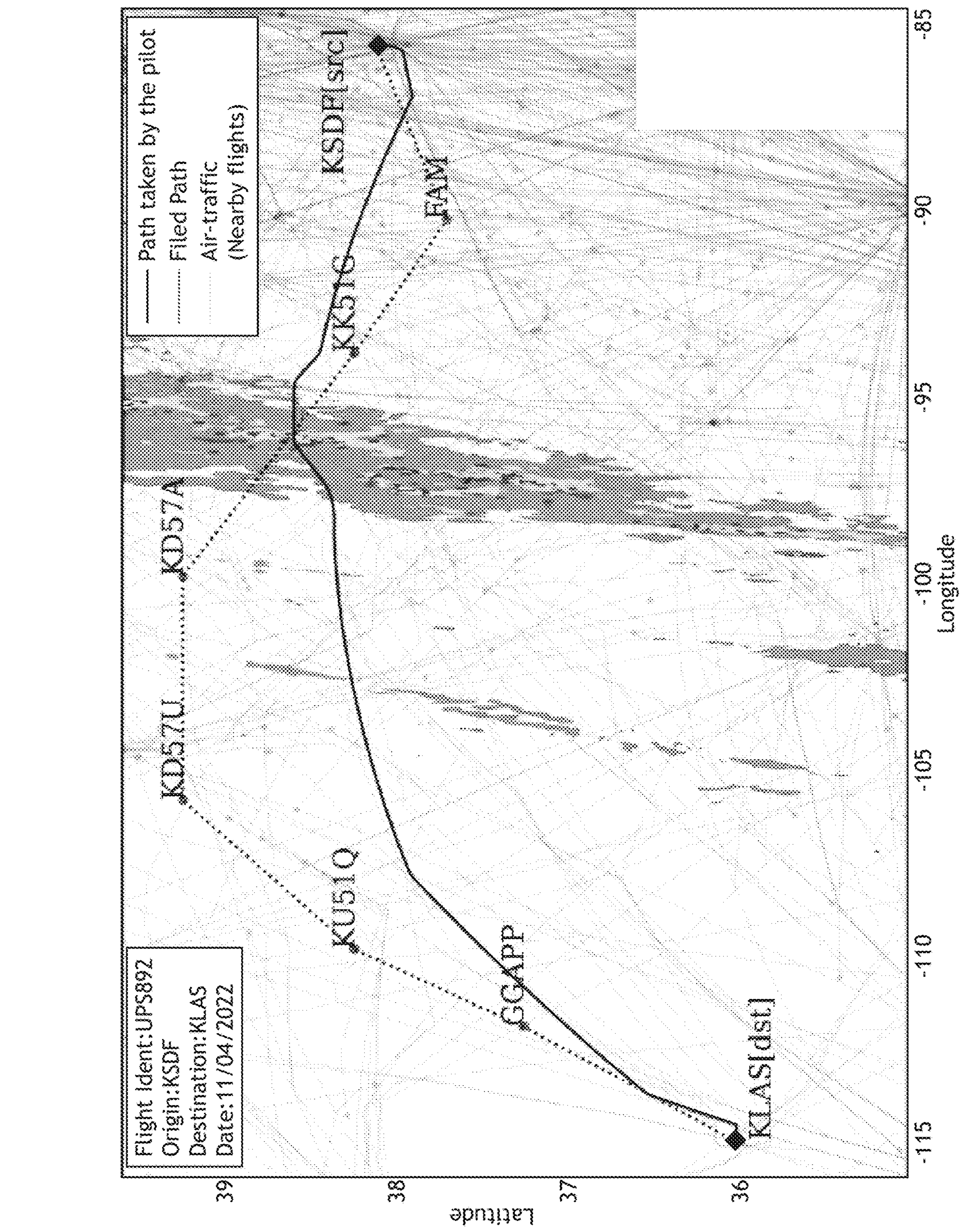
FIG. 7 is a view of an exemplary embodiment of a real world sample according to the inventive concepts disclosed herein.

Referring now to FIG. 7, an exemplary embodiment of a real world sample is shown. FIG. 7 shows a filed path, path taken by a pilot, weather, and air traffic (e.g., nearby flights). To fine tune the ML model, many real world samples may be collected, These samples may include the filed path and the actual path taken by the pilot. Additionally, the ML model can consider other parameters, such as weather, air traffic, and/or etc.

Figure 8:
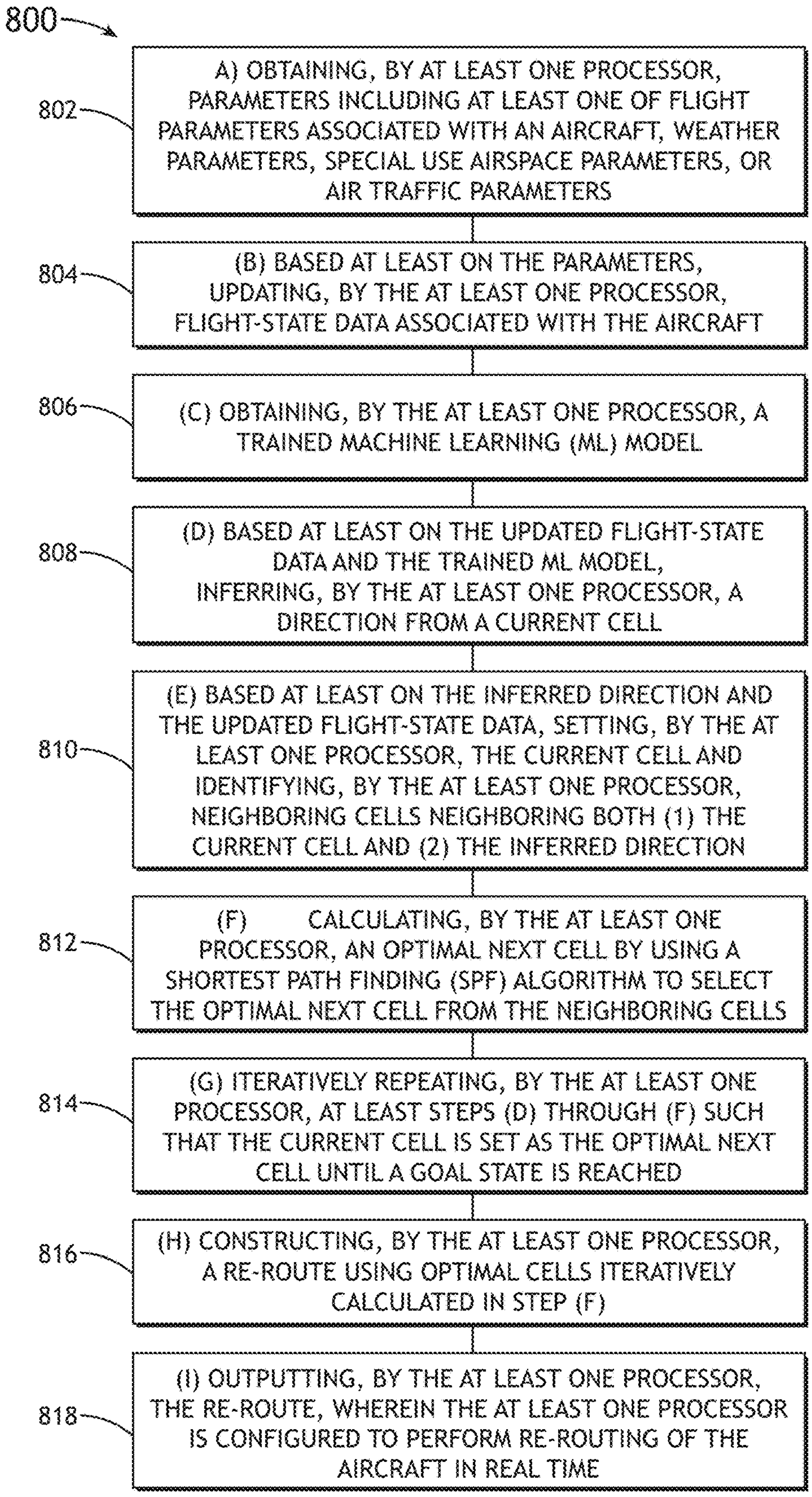
FIG. 8 is a diagram of an exemplary embodiment of a method according to the inventive concepts disclosed herein.

Referring now to FIG. 8, an exemplary embodiment of a method 800 according to the inventive concepts disclosed herein may include one or more of the following steps. Additionally, for example, some embodiments may include performing one or more instances of the method 800 iteratively, concurrently, and/or sequentially. Additionally, for example, at least some of the steps of the method 800 may be performed in parallel, iteratively, and/or concurrently. Additionally, in some embodiments, at least some of the steps of the method 800 may be performed non-sequentially.

A step 802 may include (a) obtaining, by at least one processor, parameters including at least one of flight parameters associated with the aircraft, weather parameters, special use airspace parameters, or air traffic parameters.

A step 804 may include (b) based at least on the parameters, updating, by the at least one processor, flight-state data associated with the aircraft.

A step 806 may include (c) obtaining, by the at least one processor, a trained machine learning (ML) model.

A step 808 may include (d) based at least on the updated flight-state data and the trained ML model, inferring, by the at least one processor, a direction from a current cell.

A step 810 may include (e) based at least on the inferred direction and the updated flight-state data, setting, by the at least one processor, the current cell and identifying, by the at least one processor, neighboring cells neighboring both (1) the current cell and (2) the inferred direction.

A step 812 may include (f) calculating, by the at least one processor, an optimal next cell by using a shortest path finding (SPF) algorithm to select the optimal next cell from the neighboring cells.

A step 814 may include (g) iteratively repeating, by the at least one processor, at least steps (d) through (f) such that the current cell is set as the optimal next cell until a goal state is reached.

A step 816 may include (h) constructing, by the at least one processor, a re-route using optimal cells iteratively calculated in step (f).

A step 818 may include (i) outputting, by the at least one processor, the re-route.

Further, the method 800 may include any of the operations disclosed throughout.

Referring generally again to FIGS. 1-8, as will be appreciated from the above, embodiments of the inventive concepts disclosed herein may be directed to a system and a method configured to perform re-routing of an aircraft in real time.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:

at least one non-transitory computer readable media containing computer-executable instructions that, when executed by at least one processor, perform a method of re routing an aircraft in real time comprising:

(a) obtain parameters including at least one of flight parameters associated with the aircraft, weather parameters, special use airspace parameters, or air traffic parameters;

(b) based at least on the parameters, update flight-state data associated with the aircraft;

(c) obtain a trained machine learning (ML) model;

(d) based at least on the updated flight-state data and the trained ML model, infer a direction from a current cell for a reroute;

(e) based at least on the inferred direction and the updated flight-state data, set the current cell and identify neighboring cells neighboring both (1) the current cell and (2) the inferred direction;

(f) calculate an optimal next cell by using a shortest path finding (SPF) algorithm to select the optimal next cell from the neighboring cells, wherein the SPF algorithm is integrated with a ML-based classification that reduces a number of directions the SPF algorithm analyzes by identifying an optimal direction at the current cell to reduce a load of executing the SPF algorithm to calculate a re-route in real time to reduce latency of the re-route;

(g) iteratively repeat at least steps (d) through (f) such that the current cell is set as the optimal next cell until a goal state is reached;

(h) construct a re-route using optimal cells iteratively calculated in step (f);

(i) output the re-route; and (j) cause the re-route of the aircraft to be performed in real time.

2. The system of claim 1, the method of re routing an aircraft in real time further comprising: output the re-route to an aircraft display for presentation to a pilot.

3. The system of claim 1, the method of re routing an aircraft in real time further comprising: to output the re-route to air traffic control.

4. The system of claim 1, wherein at least some of the at least one processor is installed on the aircraft.

5. The system of claim 1, wherein at least some of the at least one processor is installed offboard of the aircraft.

6. The system of claim 1, further comprising an avoidance re-router, wherein at least some of the at least one processor is installed in the avoidance re-router.

7. The system of claim 1, further comprising a flight management system (FMS), wherein at least some of the at least one processor is installed in the FMS.

8. The system of claim 1, the method of re routing an aircraft in real time further comprising: obtain the parameters including the flight parameters associated with the aircraft, the weather parameters, the special use airspace parameters, and the air traffic parameters.

9. The system of claim 1, wherein each cell is part of a three-dimensional array of cells, each cell representing a location in three-dimensional space.

10. The system of claim 1, wherein each cell represents a waypoint.

11. The system of claim 1, wherein the goal state represents a destination.

12. The system of claim 1, wherein the goal state represents a location where the re-route rejoins a flight plan.

13. The system of claim 1, wherein the goal state represents a particular waypoint.

14. The system of claim 1, wherein the trained ML model is trained based at least on real-world samples of filed paths as compared to actual paths taken by sampled aircraft.

15. The system of claim 1, the method of re routing an aircraft in real time further comprising: based at least on the inferred direction and the updated flight-state data, set the current cell, identify the neighboring cells neighboring both (1) the current cell and (2) the inferred direction, and disable non-neighboring cells.

16. The system of claim 1, wherein artificial intelligence (AI) acceleration is used to perform at least one of the steps of (a) through (i).

17. The system of claim 1, wherein neural processing is used to perform at least one of the steps of (a) through (i).

18. A method, comprising:

(a) obtaining, by at least one processor, parameters including at least one of flight parameters associated with an aircraft, weather parameters, special use airspace parameters, or air traffic parameters;

(b) based at least on the parameters, updating, by the at least one processor, flight-state data associated with the aircraft;

(c) obtaining, by the at least one processor, a trained machine learning (ML) model;

(d) based at least on the updated flight-state data and the trained ML model, inferring, by the at least one processor, a direction from a current cell;

(e) based at least on the inferred direction and the updated flight-state data, setting, by the at least one processor, the current cell and identifying, by the at least one processor, neighboring cells neighboring both (1) the current cell and (2) the inferred direction;

(f) calculating, by the at least one processor, an optimal next cell by using a shortest path finding (SPF) algorithm to select the optimal next cell from the neighboring cells, wherein the SPF algorithm is integrated with a ML-based classification that reduces a number of directions the SPF algorithm analyzes by identifying an optimal direction at the current cell to reduce a load of executing the SPF algorithm to calculate a re-route in real time to reduce latency of the re-route;

(g) iteratively repeating, by the at least one processor, at least steps (d) through (f) such that the current cell is set as the optimal next cell until a goal state is reached;

(h) constructing, by the at least one processor, a re-route using optimal cells iteratively calculated in step (f);

(i) outputting, by the at least one processor, the re-route; and (j) causing, by the at least one processor, the re-route of the aircraft to be performed in real time.

* * * * *